(12) United States Patent
McCormick et al.

(10) Patent No.: US 8,647,014 B2
(45) Date of Patent: Feb. 11, 2014

(54) BUOY SYSTEMS AND METHODS FOR MINIMIZING BEACH EROSION AND OTHER APPLICATIONS FOR ATTENUATING WATER SURFACE ACTIVITY

(75) Inventors: Michael E. McCormick, Annapolis, MD (US); Robert Murtha, Stevensville, MD (US)

(73) Assignee: Murtech, Inc., Glen Burnie, MD (US)

( * ) Notice: Subject to any disclaimer, the term of this patent is extended or adjusted under 35 U.S.C. 154(b) by 247 days.

(21) Appl. No.: 13/113,298

(22) Filed: May 23, 2011

(65) Prior Publication Data

US 2011/0299927 A1  Dec. 8, 2011

Related U.S. Application Data

(60) Provisional application No. 61/350,633, filed on Jun. 2, 2010.

(51) Int. Cl.
*E02B 3/04* (2006.01)

(52) U.S. Cl.
USPC .............. 405/27; 405/15; 405/21; 405/23; 405/25; 405/26; 441/6; 441/21; 441/28; 441/29

(58) Field of Classification Search
USPC .............. 405/15, 21, 23, 26, 27, 25; 441/6, 441/21–29
See application file for complete search history.

(56) References Cited

U.S. PATENT DOCUMENTS

| 1,636,447 | A | * | 7/1927 | Standish | ............... 114/327 |
| 3,376,588 | A |   | 4/1968 | Berteaux et al. | |
| 3,755,836 | A |   | 9/1973 | Milazzo | |
| 3,846,990 | A |   | 11/1974 | Bowley | |
| 3,848,419 | A |   | 11/1974 | Bowley | |
| 4,048,802 | A | * | 9/1977 | Bowley | ............... 405/26 |
| 4,280,238 | A | * | 7/1981 | van Heijst | ............... 441/21 |
| 4,894,873 | A | * | 1/1990 | Kiefer et al. | ............... 4/497 |
| 5,558,459 | A | * | 9/1996 | Odenbach et al. | ............... 405/21 |
| 2006/0112871 | A1 | * | 6/2006 | Dyhrberg | ............... 114/293 |

FOREIGN PATENT DOCUMENTS

| CA | 1193490 | 9/1985 |
| DE | 2248260 | 4/1974 |

OTHER PUBLICATIONS

"A Resonant Point Absorber of Ocean Wave Power," Natures, vol. 256, pp. 478-480 (1975).
Falnes, "Ocean Wave Oscillating Systems," published by Cambridge University Press, 2002, pp. 196-224.

(Continued)

*Primary Examiner* — Benjamin Fiorello
*Assistant Examiner* — Carib Oquendo
(74) *Attorney, Agent, or Firm* — Caesar, Rivise, Bernstein, Cohen & Pokotilow, Ltd.

(57) ABSTRACT

A buoy for use in reducing the amplitude of waves in water and a system making use of plural buoys to create a floating breakwater. Each buoy is arranged to be constrained, e.g., connected to an anchor, and comprising a body e.g., a cylindrical member having at least one outwardly projecting fin, that is configured to be resonant and impedance matched. The buoy and anchoring approach allows for self-tuning to the changes in the wave spectrum due to the tidal or storm surge induced changes in the water depth. The body of the floating buoy is not limited to circular cylinder, and could be square, hexagonal, triangular, etc. but must have at least one exterior mounted fin.

35 Claims, 7 Drawing Sheets

(56) References Cited

OTHER PUBLICATIONS

Garnaud, et al, "Comparison of Wave Power Extraction by a Compact Array of Small Buoys and by a Large Buoy", Proceedings, 8th European Wave and Tidal Energy Conference, Uppsala, Sweden, Sep. 7-10, Paper VII-C-1., pp. 934-942.

Lee, et al., "On the floating breakwater—a new arrangement," Proceedings, International Conf. on Coastal Engineering, Taipei (1986), pp. 2017-2022.

Liang, et al., "A study of spar buoy floating breakwater," Ocean Engineering, 31(2004) 43-60.

McCormick, "Ocean Wave Energy Conversion," published by Wiley—Interscience, New York (1981, reprinted by Dover Publication, Long Island, New York in 2007), pp. 117-136.

Murali, et al., "Performance of Cage Floating Breakwater", Journal of Waterway, Port, Costal and Ocean Engineering (ASCE), vol. 123, No. 4, pp. 172-179 (1997).

International Search Report dated Aug. 12, 2011 re PCT/US2011/038709.

\* cited by examiner

BUOY SYSTEMS AND METHODS FOR MINIMIZING BEACH EROSION AND OTHER APPLICATIONS FOR ATTENUATING WATER SURFACE ACTIVITY

CROSS-REFERENCE TO RELATED APPLICATIONS

This utility application claims the benefit under 35 U.S.C. §119(e) of Provisional Application Ser. No. 61/350,633 filed on Jun. 2, 2010 entitled Buoy System For Floating Breakwaters, the entire disclosure of that provisional application is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to breakwaters and more particularly to floating systems including at least one buoy arranged for reducing the amplitude of water waves for various purposes, e.g., minimizing beach erosion, creating sheltered harbors, facilitating clean-up of oil spills, calming wave energy conditions at the shoreline for sub-aquatic vegetative (SAV) or tidal vegetative growing conditions, reducing wave energy for embarkation and debarkation of offshore platforms from floating vessels, reduction of ship waves in close channel locations, etc.

BACKGROUND OF THE INVENTION

The diffraction focusing phenomenon of water waves has been considered for enhancing wave-energy. In particular, the diffraction focusing phenomenon of water waves for energy conversion was initially proposed by Budal and Falnes in their paper "A Resonant Point Absorber of Ocean Waves", Natures, Vol 256, pp. 478-479 (1975). Those authors called small bodies producing the phenomenon "point-absorbers". Essentially, it is a focusing of incident wave energy on a small body resonating in one or more modes with the incident wave. In short, the body acts as a hydrodynamic antenna. "Ocean Wave Energy Conversion" by M. E. McCormick, published by Wiley-Interscience, New York (1981, reprinted by Dover Publication, Long Island, N.Y. in 2007) refers to the phenomenon as "antenna focusing". The focusing effect is due to a destructive interference between the waves radiated from the body on the incident waves. Budal and Falnes produced a number of papers illustrating how point-absorption could enhance wave-energy conversion. The book entitled "Ocean Wave Oscillating Systems" by Falnes, published by Cambridge University Press, 2002 includes a summary of the findings of these two investigators. In wave-energy conversion by a point-absorber, the conversion must be "active" in the sense that a turbine or some other type of power take-off system must be used. In addition, a control system should be incorporated. Recent advances in both power take-off and control subsystems are presented in the proceedings of the European Wave and Tidal Energy Conference, held in Sweden in September, 2009. See "Comparison of Wave Power Extraction by Compact Array of Small Buoys and by a Large Buoy", Proceedings, $8^{th}$ European Wave and Tidal Energy Conference, Uppsala, Sweden, Sep. 7-10, Paper VII-C-1.

The diffraction focusing phenomenon of water-wave energy caused by floating body motions (heaving, surging or pitching) have been shown to provide the ability of relatively small bodies to capture wave energy from crest widths that are several times the body's horizontal dimension. As is known, such moving bodies act as "antennae" to produce radial waves which destructively interact with the incident waves, causing a transfer of energy (by diffraction) along the crest to the body. Thus, such bodies have been proposed for forming floating breakwaters. Floating breakwaters of various types have been in existence for many decades since, they are deployed with relative ease, and have less environmental consequences compared to rock structures. The effectiveness of floating breakwaters, however, is somewhat less than nearshore armor breakwaters. Normally, floating breakwaters, designed to protect the leeward waters, have extensive lengths that are parallel to the crest width of the design wave. The units can be either continuous in the crest direction or segmented.

Arrays of buoys have also been studied for the purpose of shore protection, where the spacing between the component buoys is relatively small. In all of these cases, the units are designed to resonate with a wave having a specific period, T, with no regard to the actual impedance of the system.

A recent study of the effects of buoy impedance is that of Liang, Huang and Li in their article "A Study of Spar Buoy Floating Breakwater", in Ocean Engineering, Vol. 31, No. 1, pp. 43-60 (2004). In that study, tension-moored spar buoys of deep draft equipped with damping plates are proposed for shore protection. The buoys absorb energy by heaving motions, and dissipate the energy in the alternating wakes of the damping plates. The focus of the study is on the effectiveness of the damping plates on the closely packed arrays of spar buoys. Other floating breakwater configurations include cages, as discussed by Murali and Mani in their article "Performance of Cage Floating Breakwater", Jl. Of Waterway, Port, Costal and Ocean Engineering (ASCE), Vol. 123, No. 4, pp. 172-179 (1997), tube-nets and spheres, as discussed by Twu and Lee in their article "Wave Transmission in Shallow Water through the Arrangements of Net Tubes and Buoyant Balls", Proceedings, $7^{th}$ Conf. on Ocean Engineering, Taipei, Vol. II, pp. 26, 1-26, 21 in Chinese (1983). All of these rely on a "brute force" method of extracting and dissipating the wave energy. That is, there is little sophistication in the design as far as the impedance is concerned. Furthermore, by design, the breakwaters are impassible since they are either long and continuous or in closely packed arrays.

Thus, there presently exists a need for a floating breakwater which overcomes the disadvantages of the prior art. The subject invention addresses that need.

SUMMARY OF THE INVENTION

In accordance with one aspect of the invention there is provided a buoy for use in reducing the amplitude of waves in water. The buoy is arranged to be constrained and comprises a body configured to be resonant and impedance matched (i.e., when radiation and viscous losses are equal the buoy absorbs and dissipates the wave energy, thereby significantly reducing the energy of the transmitted waves).

In accordance with another aspect of this invention plural buoys so constructed can be deployed in an array of predetermined spacing to form a system establishing an efficient breakwater for coastal and waterway protection. The array may be singular, line or multiple line, tuned to the varying wave frequencies, a band pass filter solution.

The materials used for the construction of the buoy may be metal, plastic, composites, natural or any combination thereof. The color of the buoys may vary. The anchoring technique may vary due to the wave height and water depth of the application, The body of the floating buoy is not limited to a circular cylinder, but could be square, hexagonal, triangular, etc, but must have at least a one exterior mounted fin for the purpose of attenuation of energy.

DESCRIPTION OF THE DRAWING

FIG. 11B is a sectional view taken along line B-B of FIG. 11A; The number of springs or geometry of the assembly, as well as the material of the springs should be considered in the design of each application.

DETAILED DESCRIPTION OF THE PREFERRED EMBODIMENT

Referring now to the various figures of the drawing wherein like reference characters refer to like parts, there is shown in FIG. 1 one exemplary device constructed in accordance with this invention. The device is a resonant, impedance-matched floating "antenna buoy" designed to capture and dissipate the energy of water waves. It can be deployed singularly or in arrays of two or more to form a system that can be used to protect coastlines, harbors, waterways and moored ships. It can also be utilized to mitigate oil spills, such as the recent oil disaster in the Gulf of Mexico which has been delayed due to wind-driven heavy seas. To that end a system of a plurality of buoys constructed in accordance with this invention can act as offshore partial breakwaters to allow for the oil cleanup in the less energetic seas that are leeward of the system.

The significant defining property of the buoys of this invention is that they are impedance-matched. That is, the wave energy captured and lost to damping due to the action of viscosity at one or more of the sharp or round edges of the buoy and its submerged appendages equals the energy lost to radiation due to the buoy-motion. The buoy can operate in one or more modes (radial or angular). Although the buoys of this invention may make use of many anchoring techniques that will support the desired energy dissipation system, these techniques enable those buoys to self-tune to the change in the frequency spectrum caused by the rise and fall of the tides.

While diffraction focusing of water-wave energy caused by floating body motions has been shown to enhance the ability of relatively small bodies to exploit water waves for small-to-medium scale energy conversion, the buoys of this invention, which are based on the focusing phenomenon, can also be used significantly reduce the wave heights in deep water. That is, a buoy constructed in accordance with this invention can act as a deep-water partial breakwater. In the wave-energy conversion area, similar bodies are referred to as "point-absorbers". The motions (usually heaving, surging or pitching, or a combination thereof) of a point-absorber produce radial waves which destructively interact with the incident waves, causing a transfer of energy (diffraction) along the crest to the body. The effectiveness of the floating system is maximum if the body is both in resonance with the incident waves and the radiation and absorption impedances are matched. The buoy absorbs and dissipates the wave energy, thereby reducing the energy of the transmitted waves. Hence, the resonating, impedance-matched buoy can act as a floating breakwater. Heretofore, floating breakwaters were designed to resonate without any consideration of impedance matching.

Moreover, each antenna buoy of this invention, either alone or in combination with other similar buoys, forms a bi-modal (heaving and pitching or rocking) wave attenuating system that has the ability to capture and dissipate the energy of incident water waves, while occupying small areas. The buoys may be deployed in arrays, where the separation distance of the buoy units depends on the design incident wavelength. Each buoy is easily deployed and retrieved, and the unit cost is a small fraction of the rubble-mound structures that are normally used for protection against damaging waves. Hence, the system of this invention is a cost effective alternative to hard-stabilization techniques.

A significant contributor to the subject invention is the attachment technique to allow movement above the rigid anchor component of the buoy. As the water level changes in a tidal cycle, the antenna buoy system is self-tuning to the waves within the design parameters at the site. This feature is due to the pendulum effect of the design shown in FIGS. 1, 2 and 3.

Figure 1A:
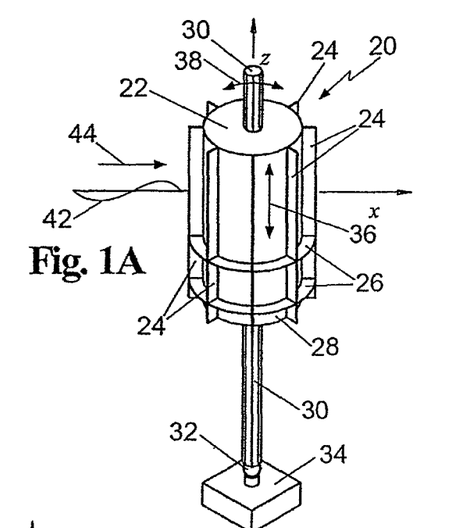
FIG. 1A is an isometric view of one exemplary embodiment of a buoy constructed in accordance with this invention.
Figure 1B:
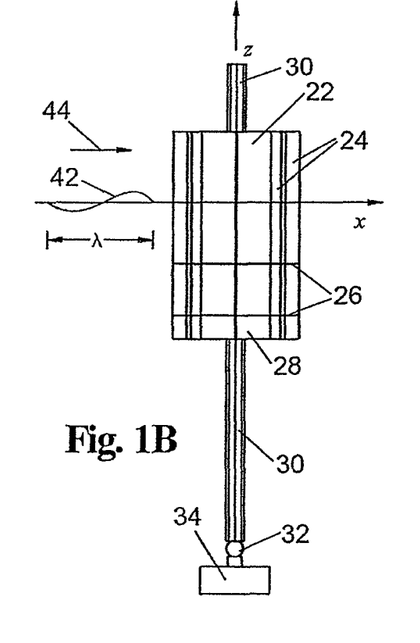
FIG. 1B is a side elevation view of the buoy shown in FIG. 1.

The exemplary embodiment of the buoy shown in FIG. 1 is denoted by the reference number 20 and is particularly suited for use as a breakwater, e.g., the configuration is designed to be a unit of an array for coastal and harbor protection. As can be seen the buoy 20 comprises a bi-modal (radial and angular motions), buoyant, vertical circular cylinder or body equipped with vertical inertial-damping fins 24 and at least one annular inertial-damping fins 26. In the embodiment shown in FIGS. 1A and 1B two annular intertial damping fins 26 are shown. That is merely exemplary since the antenna buoys of this invention can have any number of such fins. It should be noted that the term "inertial" used as a part of the fin name refers to the influence of the fin on both the added-mass (the mass of the ambient water affected by the rectilinear and angular motions of the buoy) and added-mass moment of inertia. Moreover, the term "damping" used as a part of the fin name refers to damping due to the energy dissipation of the viscous fluid actions on the fin. The geometries of the float and the fins both affect the added-mass and radiation damping. Hence, they must be designed for a particular wave period.

For a design sea, there will be no fins if the viscous damping due to the bottom of the buoy matches the radiation damping for the period of the design wave. This period might be the average period or the modal period, the latter being the period corresponding to the maximum energy of the sea. The geometric design must be done so to satisfy the resonance and impedance-matching requirements, where the impedances matched are those due to the viscous actions and radiation.

As will be seen from the discussion to follow, buoys constructed in accordance with this invention are designed to have simultaneous rectilinear and rotational motions. The former is a quasi-heaving motion in the axial direction of the buoy; while, the latter is a combination surging-pitching motion, and can be termed a rocking motion. The capture width (the crest width from which the wave energy is focused) for these motions should be in the range of $\lambda/2\pi$ to $3\lambda/\pi$, depending on the number of excited modes. Since the wavelength ($\lambda$) is a function of both the wave period (T) and the water depth (h), the design wave period in a random sea would be either the average wave period of the spectrum or the modal (peak-energy) period.

Referring now to FIGS. 1A and 1B more details about the construction and operation of the buoy 20 shown therein will now be described. To that end, the buoy also includes a buoyant collar 28 located at the bottom of the cylinder 22, a buoyant staff 30 coupled via a universal ball or swivel joint, or spring or any other flexible connection. The universal joint serves to connect the buoy to an anchor 34. The anchor secures the buoy to the sea bed. The universal joint allows movement above an anchor. It should be noted that the anchor can take various forms such as a, block, a mat, a jetted-in-anchor, a helical connection anchor, a framed or tripod base or any other mounting base. The anchor can be located on top of the sea bed or buried in it, e.g., a clump anchor.

Figure 6A:
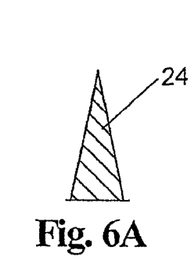
FIG. 6A-6D are respective cross sectional views of portions of various alternative configurations for the fins of buoys constructed in accordance with this invention.
Figure 6B:
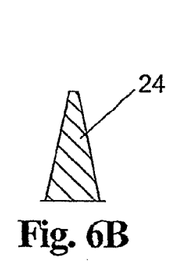
Figure 6C:
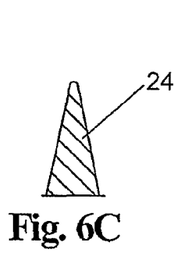
Figure 6D:
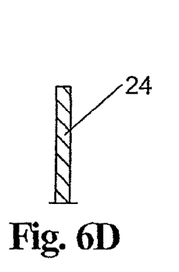
Figure 7A:
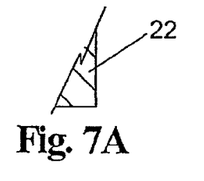
FIGS. 7A and 7B are respective cross sectional views of portions of various alternative configurations for the bottoms of buoys constructed in accordance with this invention.
Figure 7B:
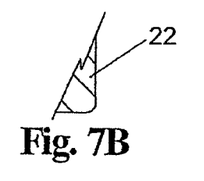

Irrespective of how the buoy is anchored, the incident waves excite the buoy 20 in both the axial direction (shown by the double headed arrow 36) of the buoyant staff 30 and in an angular direction (shown by the double headed arrow 38), rotating about the joint 32. The rectilinear and angular motions of the buoy 20 excite the ambient water. The magnitude of the water mass (added-mass) excited by the motions of the buoy 20, the staff 30, the horizontal fins 26 and the vertical fins 24 depends on the geometry of each. Thus, those fins can take various shapes and sizes. For example, referring to FIG. 6A-6E, the horizontal fins 26 and the vertical fins 24 can have sharp edges (like shown in FIG. 6A), frustum edges (like shown in FIG. 6B), rounded edges (like shown in FIG. 6C) or square edges (like shown in FIG. 6D). Moreover, the bottom of the buoy cylinder 22 can be sharp-edged (like shown in FIG. 7A) or round-edged (like shown in FIG. 7B), depending on the design requirements.

Figure 1C:
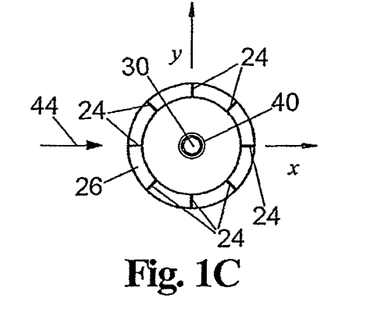
FIG. 1C is a top plan view of the buoy shown in FIGS. 1 and 1A.

As should be appreciated by those skilled in the art the motion amplitudes of the buoy 20 are limited due to the horizontal fins 26, the vertical fins 24 and the edge of the buoy. These shapes determine the drag coefficient which, in turn, determines the energy dissipation. As best seen in FIG. 1C bearings 40 are located between the buoy cylinder 22 and the staff 30 to enable the buoy cylinder to freely slide along the staff. In particular, the bearings separate those bodies and allow for a smooth axial motion (movement along the longitudinal axis of the staff 30). As best seen in FIGS. 1B and 1C the direction of an exemplary wave 42 is shown by the arrow 44 and is arbitrary with respect to the orientation of the vertical fins 24 (4).

The analysis leading to the proper design of a buoy constructed in accordance with this invention is convoluted. That is, the resonance and the impedance-matching requirements must be simultaneously satisfied. When properly designed, the bi-modal motions can theoretically focus wave energy on the buoy from a crest width of equal to a wavelength ($\lambda$) divided by the $\pi \approx 3.1416$. The significance of this is that protection can be supplied by an array of buoys that are well-spaced.

Figures 2A, 2B, 2C:
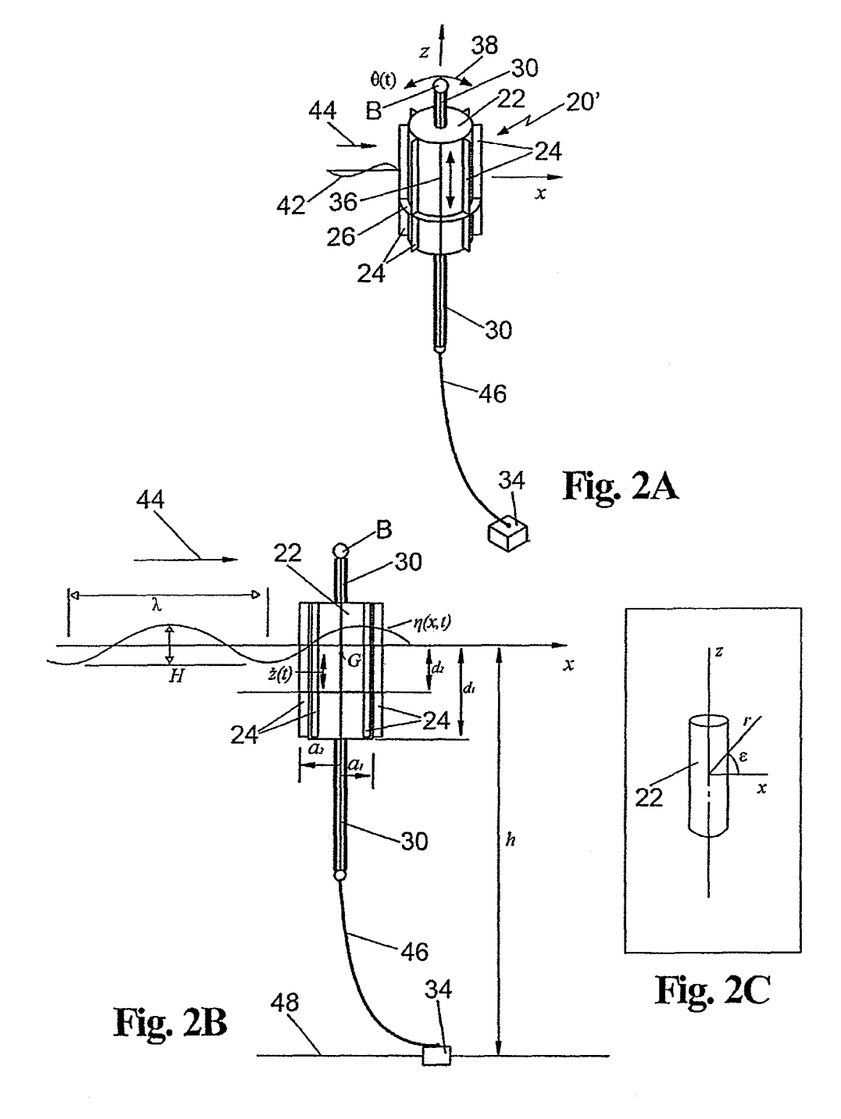
FIG. 2A is an isometric view of another exemplary embodiment of a buoy constructed in accordance with this invention.
FIG. 2B is a side elevation view of the buoy shown in FIG. 2A.
FIG. 2C is a reduced isometric view of a portion of the buoy shown in FIG. 2B.

In FIGS. 2A-2C there are shown two alternative embodiments of buoys 20' constructed in accordance with this invention. Those buoys are similar to the buoy 20 of FIG. 1, except that the buoyant collar is located at the top of the cylinder, but could be located at the bottom if desired. FIG. 2A shown the buoy The first application for buoy 20' is shown in is for use in deep water, where the water depth is greater than 20 meters and where the deep-water wavelength is about 40 meters for a 5-second average wave period. One such exemplary application is usage in the Gulf of Mexico. The second application (shown in FIGS. 3A and 3B) is in water of 10 meter depth. In both of these applications the shaft of the buoy is connected to the anchor by a flexible anchor cable or chain 46 instead of being directly connected to the anchor via a ball or other swivel joint (like shown in FIGS. 1A and 1B). Moreover, for these applications the buoy 20' only includes one horizontal fin 26. However, this is exemplary, and thus the buoy 20' can include any number of horizontal fins. The sea bed on which or in which the anchor is disposed is designated by the reference number 48.

A navigation beacon B (e.g., a lamp or some other visual and/or audible warning device or indicator) can be provided at the top of the staff 30. That beacon or device can be solar powered by means (not shown) or by battery (not shown).

To illustrate the potential effectiveness of a buoy deployed in a body of water, like the Gulf of Mexico, the buoy shown in FIGS. 2A-2C will have horizontal inertial-damping fins, but no vertical inertial damping fins (and will be referred to hereinafter as the "Gulf Design"). The body of the buoy consists of a circular float, where the plate radius and design depth are determined by simultaneously satisfying the resonance and impedance-matching conditions.

The analysis of the operation of the Gulf Design buoy assumes that the incident waves are monochromatic. The system is designed assuming an average wave height of 1.5 meters and an average wave period of 5 seconds. The data used and the optimized design results are as follows:

H (design wave height)=1.5 meters
T (design wave period)=5.0 seconds
h (design water depth)=20 meters
$a_1$ (buoy radius)=0.75 meters
$a_2$ (plate radius)=1.2 meters
$d_1$ (buoy draft)=4.0 meters
$d_2$ (plate depth)=1.95 meters For these values, the radiation impedance and the viscous impedance are approximately matched. The focusing of the waves, assuming the buoy experiences only heaving motions, comes from a crest width of $\lambda/2\pi=6.21$ meters, which is over 8-times the buoy radius and 5-times the plate (fin) radius. Hence, the Gulf Design buoys can be spaced 6.21 meters (20.3 feet) apart. The focused wave height at the buoy will be 3.05 meters, and the heaving motions of the buoy will have an amplitude of 2.1 meters. The average wave power will be reduced by 43%, resulting in a down-wave average wave height of 1.13 meters.

Figure 4:
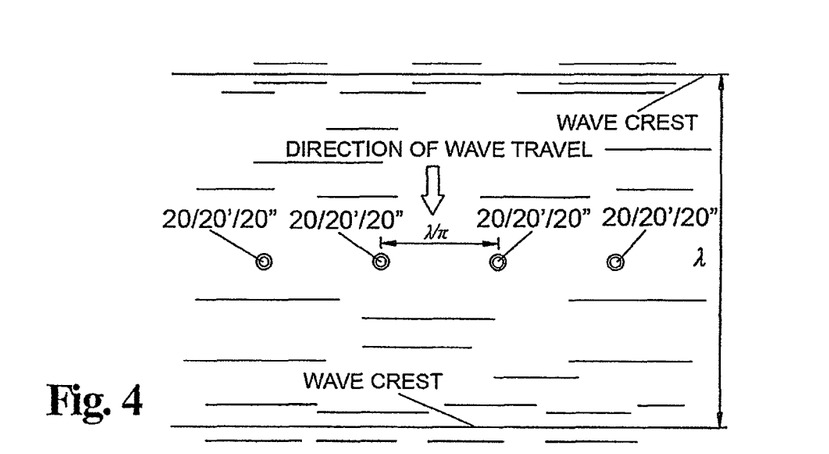
FIG. 4 is a top plan view of a system making use of a plurality of buoys constructed in accordance with this invention shown deployed in a wave environment.

In reality, the buoy shown in FIGS. 2A-2C will experience both heaving and rocking motions. As a result, the focusing will theoretically come from a crest width of $\lambda/\pi=12.42$ meters (40.7 ft). Hence, the buoy-units of an array can be separated by 12.42 meters. Taking this bi-modal focusing into account, the damping plate radius is $a_2=1.5$ meters and the depth of the plate is $d_2=2.2$ meters. For the $a_1=0.75$ meters radius of the buoy, the draft would be $d_1=2.5$ meters. An areal view for this condition is shown in FIG. 4. In that figure, the buoy units in the array are spaced to scale and the separation of the buoy units is based on the assumption that each unit experiences two motion modes, such as heaving and pitching.

Figure 3A:
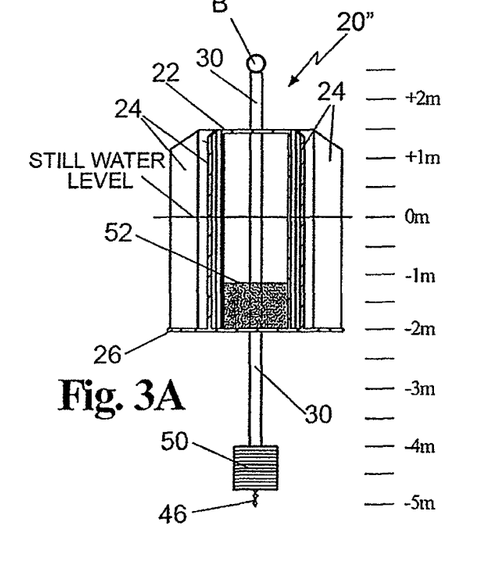
FIG. 3A is a side view partially in vertical section taken along line A-A of FIG. 3B and showing another exemplary embodiment of a buoy constructed in accordance with this invention.
Figure 3B:
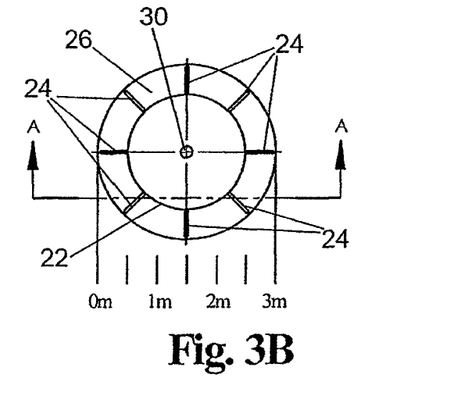
FIG. 3B is a top plan view of the buoy shown in FIG. 3A.

For intermediate water applications, e.g., where the water depth is 10 meters and the wave conditions are the same as that described above, the buoy is constructed as shown in FIGS. 3A and 3B and has the following dimensions:

h (design water depth)=10 meters
$a_1$ (buoy radius)=0.85 meters
$a_2$ (plate radius)=1.5 meters
$d_1$ (buoy draft)=2.5 meters
$d_2$ (plate depth)=1.95 meters The percentage of the wave power attenuation due to the buoy of this configuration is about 47%, and the wave height is reduced from the 1.5 meter deep-water value by approximately 27%. The buoys are separated in the 10-meter water depth by 8 meters.

In FIG. 3A another embodiment of an antenna buoy 20" constructed in accordance with this invention is shown the buoy makes use of a sting-ballast composed of 12 plates 50, each of 0.6 meter in diameter and 5.1 cm thick. In practice, these plates can be typical conventional free weight plates used in body building. In any case, the total sting ballast is approximately 3,000N, or 1.35 tonnes. This ballast enhances the pitching (or "rocking" motion) which, in turn, increases the radiation loss and the destructive interference with the incident wave field. The buoy 20" includes 6 vertical damping plates or fins 24 and one horizontal damping plate 26 (located at the bottom of the cylinder 22). The cylinder 22 is hollow and includes sand ballast 52. The buoyant staff 30 extends through the interior of the cylinder and bearings or other means are provided so that the cylinder can slide along the staff as described with reference to the embodiments of FIGS. 1 and 2. If desired a navigation aid or beacon B, like that described above, may be included in the buoy, e.g., located at the top of the staff. In this embodiment the buoy 20" is connected to the anchor via a flexible cable or chain 46.

For both the deep-water and the finite-depth water designs, the buoys of this invention are deployed in arrays, where the separation of the units in the array would be equal to the bi-modal capture width, kin. A top plan view of such an array resembles that shown in FIG. 4.

As should be apparent, the amount of reduction in wave power is quite significant insofar as floating breakwaters are concerned. By deploying the buoys of this invention in the average sea described above, a wave power reduction by at least 40% in deep water, and by 47% in 10 meters of water can be achieved. Accordingly, the resulting motions of vessels down-wave (quasi-sheltered waters) would, hence, be significantly reduced. Needless to say such action could greatly enhancing the ability to skim oil for oil clean-up applications, like those presently occurring due to the BP leak from the sinking of the Deepwater Horizon platform in the Gulf of Mexico.

Figure 5A:
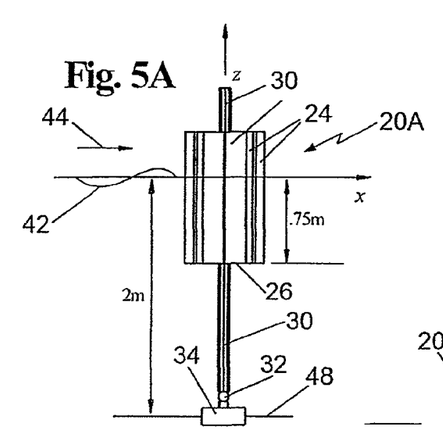
FIG. 5A is a side elevation view of another exemplary embodiment of a buoy constructed in accordance with this invention.
Figure 5B:
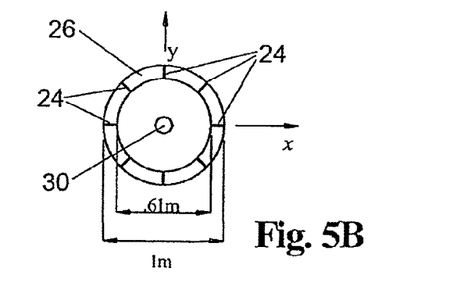
FIG. 5B is a top plan view of the embodiment of the buoy shown in FIG. 5A.
Figure 5C:
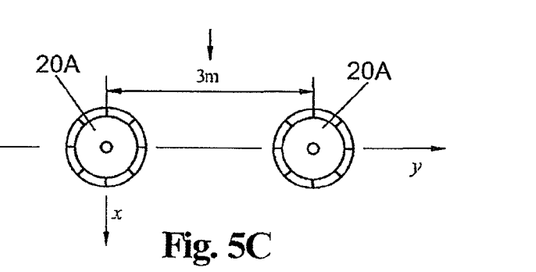
FIG. 5C is a top plan view of the spacing of two buoys constructed like FIGS. 5A and 5B shown in an exemplary application.

For applications for shoreline protection in the Chesapeake Bay, the construction of the buoy is slightly different from the Gulf Design buoy. The differences are as follows: The deployment would be in about 3 meters of water which would allow the replacement of the anchor chain/cable by a buoyant guide staff, anchored to the bottom. Because of the reduced wave climate in the Chesapeake Bay, more than one horizontal damping plate might be required, depending on the site conditions. A buoy particularly suited for use in the Chesapeake Bay is shown in FIGS. 5A and 5B and constitutes a slight variant of the buoy shown in FIG. 1. The buoy is designated by the reference number 20A and is arranged for deployment in 2 meters of water, where the average wave height is 0.5 meter, and the average period is 3 seconds. This configuration will dissipate and radiate over 50% of the incident wave energy, operating in a bi-modal manner (heaving and rocking). The dimensions of the buoyant sting are to be determined. The buoy will be sand-ballasted, and the buoy and sting are to be made of a synthetic material. The horizontal inertial/damping plate and the vertical fins are to be made of metal (e.g., steel or aluminum).

Figure 8:
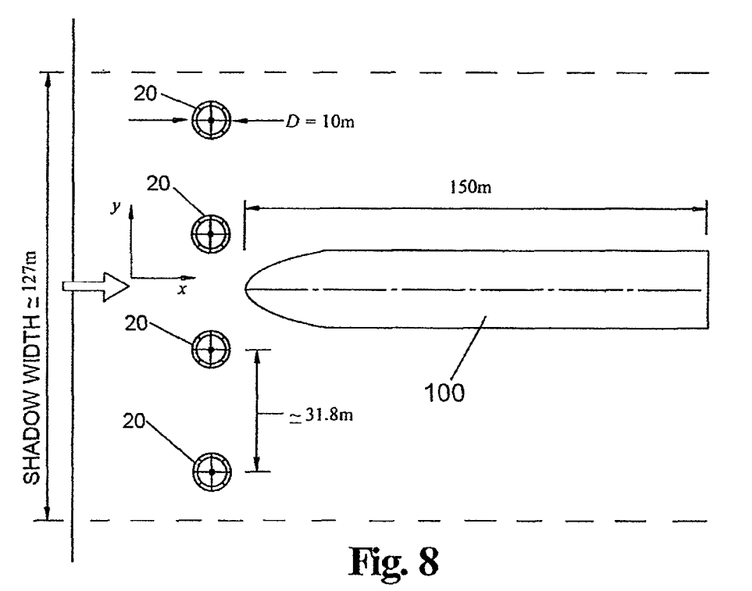
FIG. 8 is a top plan view of a system making use of a plurality of buoys constructed in accordance with this invention shown deployed in a wave environment to create a breakwater or harbor for a vessel.

To illustrate an application of a breakwater system made up of plural buoys 20 (oro any other buoys constructed in accordance with this invention), consider a 150-meter long ship 100, like that illustrated in FIG. 8, which is moored in deep water where the deep-water wavelength of an 8-second incident wave is approximately 100 meters. The beam of the ship is 30 meters. For the 8-second design wave, energy from a crest width of about 31.8 meters is focused on the buoy, which would have a diameter (D) of 10 meters, or less. A 10-meter diameter unit is used for this illustration. A four-unit array, spaced 31.8 meters apart provides a protective shadow of approximately $4\lambda/\pi \simeq 127$ meters. The array, then, provides a virtual offshore harbor for the ship.

Figure 9:
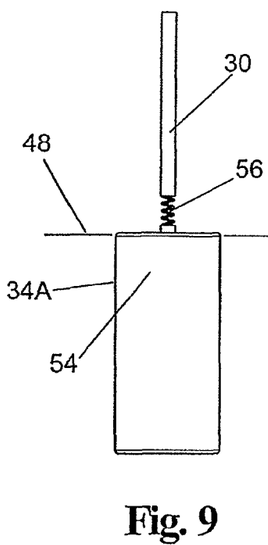
FIG. 9 is a side elevation view of a below-the-mudline anchor configuration constructed in accordance with another aspect of this invention.

Turning now to FIG. 9, there is shown an embodiment of an anchoring system 34A constructed in accordance with one aspect of this invention, This anchoring system includes an anchor section 54 that is connected to the bottom of the staff 30 by a flexible spring assembly 56 to enable the buoy to pivot in all directions with respect to the anchor. The anchor section 56 is water jetted into the coastal floor to a point, just below the spring assembly 56. The buoy riser shaft is hollow, and the bottom is attached to a flexible hose that runs through the center of the spring assembly, and attaches to the anchor section. The pressurized water is introduced at the top of the buoy shaft and is expelled out the bottom of the anchor or out of selected holes (not shown) in the anchor assembly to liquefy the mud or sand floor. This action allows the anchor to be seated to its appropriate depth. The anchoring assembly includes plural paddles (not shown) to provide stability to the assembly. The buoy riser shaft is attached to the top of the spring assembly and allows the buoy to traverse the tidal range, if applicable to the water application. The height of the buoy riser shaft is dependent on the water depth and the tidal range. The spring assembly shown in FIG. 9 is a single spring configuration. This spring assembly provides resistance and ability to return to static vertical state. The number springs, type of springs, material of springs are all part of the design of the optimized antenna buoy solution for water depths that this anchor system is appropriate.

Figure 10A:
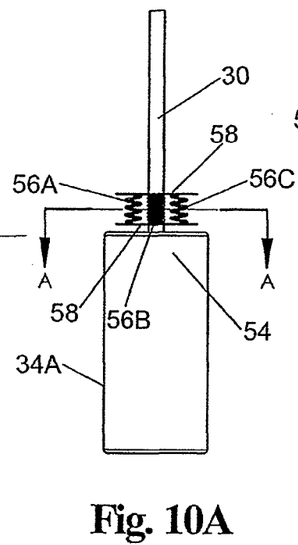
FIG. 10A is a side elevation view of a below-the-mudline anchor configuration with a multiple spring attachment of the buoy riser pipe to the anchor that is constructed in accordance with another aspect of this invention.
Figure 10B:
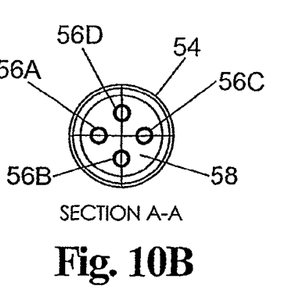
FIG. 10B is a sectional view taken along line A-A of FIG. 10A.
Figure 11A:
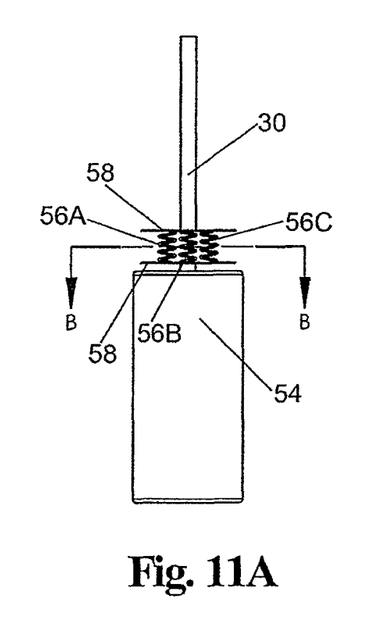
FIG. 11A is a side elevation view of a another possible configuration of below-the-mudline anchor and different spring assembly attachment between the anchor and the buoy riser pipe that is constructed in accordance with another aspect of this invention.
Figure 11B:
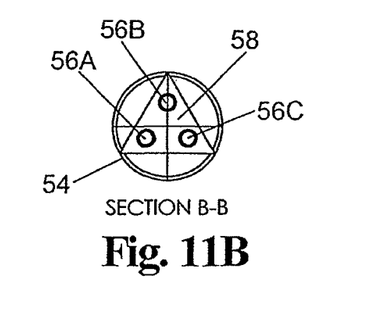

Turning to FIGS. 10A, 10B, 11A and 11B, examples of variations of the buoy embodiment of FIG. 9 are shown. In particular, these variations include the heretofore discussed a buoy shaft, anchor assembly and spring assembly, but also include the flexible hose attaching the buoy shaft and anchor shaft, through the spring assembly. For example FIGS. 10A and 10B show an example of a spring assembly 56 containing multiple, e.g., four springs 56A, 56B and 56C. The springs are located between a pair of plates 58. In the embodiment shown the plates are of circular profile, but can be of other shapes as well. FIGS. 11A and 112B shows a three spring assembly composed of springs 56A, 56B and 56C, which are located between a pair of triangular plates. It should be pointed out at this juncture that the number of springs and type of springs is selected or adjusted to fit the particular application. Moreover, the material(s) used for the buoys, and the geometry of the buoy's components are part of the antenna buoy performance design. Thus, they can be changed as appropriate for site specific conditions. The intent is to optimize any of the variables, geometry, material, spring size, and platform.

Figure 12A:
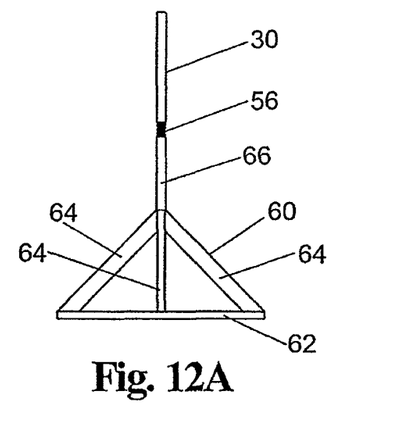
FIG. 12A is a side elevation view of an on-the-bottom anchor platform with the spring attachment assembly for the buoy riser and anchor platform connection constructed in accordance with another aspect of this invention; The multiple spring assembly attachments shown in FIGS. 11A and B can be utilized in this application as well.

In FIG. 12A there is shown an exemplary embodiment of an on-the-bottom anchor platform 60 constructed in accordance with another aspect of this invention for applications where it is not possible to anchor below the floor elevation. This embodiment makes use of the spring attachment assembly like shown in FIG. 9 for the buoy riser and anchor platform connection. In this embodiment the attachment of the flexible high pressure hose between the buoy shaft, through the anchor assembly and to the anchor platform is not required.

It should be noted that for an embodiment like FIG. 12A, any of the multiple spring assembly attachments shown in FIGS. 10A and 11A can be utilized as well. The anchor platform 60 includes a base 62 from which plural struts 64 project upward at an angle to meet at the apex of the platform and from there a vertical post 66 extends upward to the spring assembly 56. The platform dimensions are to be sufficient to resist overturning. Moreover, material, weight, dimensions are intended to be adjusted to the site conditions and available materials to build an acceptable anchoring platform that the buoy shaft and spring assembly can attach.

Figure 12B:
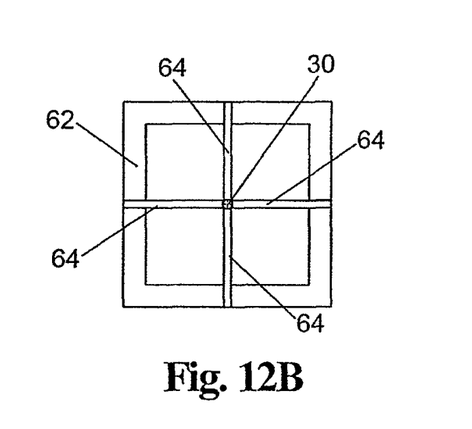
FIG. 12B is a top plan view of the embodiment shown in FIG. 12A.
Figure 13A:
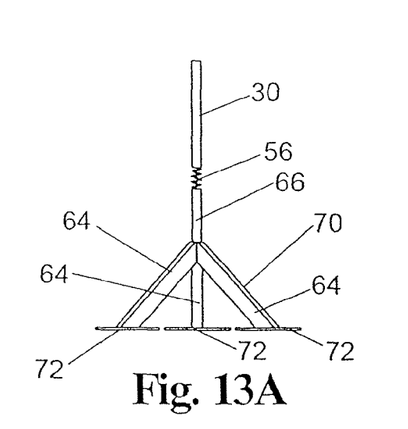
FIG. 13A is a side elevation view of another possible configuration of an on-the-bottom platform with a spring, wherein a single spring attachment assembly is located between the anchor technique and the buoy riser.
Figure 13B:
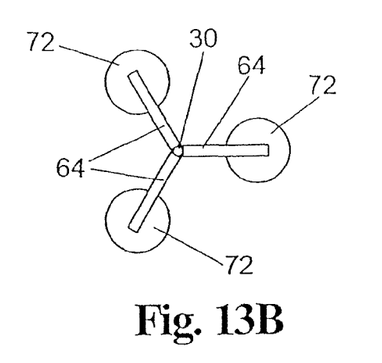
FIG. 13B is a top plan view of the embodiment shown in FIG. 13A.

FIGS. 13A and 13B show another alternative of an on-the-bottom anchor platform 70. The spring assembly and the buoy riser shaft are constructed in a similar manner with the spring assembly and buoy riser shaft of the embodiment of FIGS. 12A and 12B. Thus, the anchor platform 70 is constructed similarly to platform 60, except that it doesn't include a common base. Instead the anchor platform 70 includes respective plural circular pads, e.g., circular plates, mounted at the bottom of the struts 64. In this embodiment a single spring attachment assembly is located between the anchor platform and the buoy riser. It should be noted that in this case, the multiple spring assembly shown in FIGS. 10A and 11A can also be used.

Figure 14A:
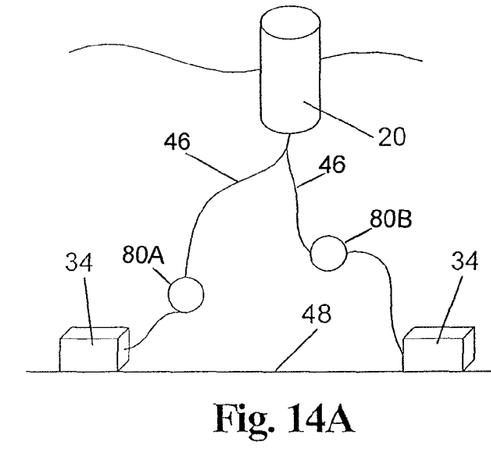
FIG. 14A is an isometric view of a variant to the anchoring technique shown in FIG. 2 constructed in accordance with another aspect of this invention.
Figure 14B:
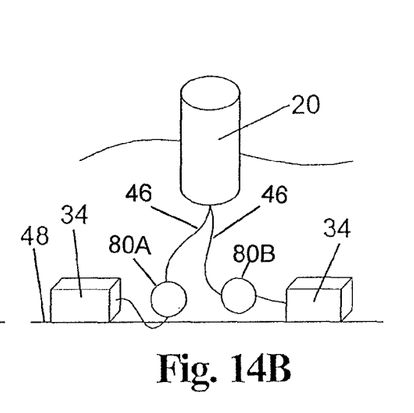
FIG. 14B is an isometric view of a low tide elevation of a buoy, like that of FIG. 14A, shown with the clump anchor resting on the floor.

Turning to FIGS. 14A and 14B, an anchoring technique in accordance with one aspect of this invention is shown and is a variant to the anchoring technique shown in FIG. 2. In particular, the illustrations of FIGS. 14A and 14B show the use of clump anchors 80A and 80B attached to anchor line/chain 46 to allow for some adjustment to tidal conditions or a variant to tuning the independent floating variant of the antenna buoy. FIG. 14A is an example of the deployment of an anchor system constructed in accordance with this invention in high tide environments, whereas FIG. 14B is example of the of an anchor system constructed in accordance with this invention in low tide conditions. In either of these techniques adjusting the slack line clump anchor enables the buoy 20 to remain in relative placement area during the various tide ranges.

As should be appreciated by those skilled in the art, the attenuated buoy system of this invention is self-adjusting/tuning to resonance frequency with the rise and fall of the water level when used in tide influenced bodies of water. With shallow water, shorter waves, high tide longer waves reach the beach. The pendulum motion is shorter for shallow water, shorter waves, and longer for deeper water, longer waves.

It should be pointed out at this juncture that the exemplary embodiments shown and described above constitute a few examples of a large multitude of buoys that can be constructed in accordance with this invention. Thus, the antenna buoys of this invention can be of different sizes and shapes and can have any number of horizontal and/or vertical and/or angularly oriented fins. The particular, size, shape, construction and spacing of the buoys will be a function of the particular application to which it will be put. There are three parameters that appear to be paramount in the development of any particular system for any particular application. Those are the added-mass, the radiation damping coefficient and the time-dependent viscous drag coefficient. The parameters depend on the shape of the buoy part of the system, in addition to the frequency and amplitudes of the two motions. Moreover, since the design of each buoy unit of any system is based on a specific wave period (average, modal, etc.), the individual buoy units of an array will be separated according to the capture width for that design period.

Without further elaboration the foregoing will so fully illustrate our invention that others may, by applying current or future knowledge, adopt the same for use under various conditions of service.

We claim:

1. A buoy for use in reducing the amplitude of waves traveling in a body of water, said buoy comprising:
   a body that when in use in the body of water is freely slidably coupled onto a staff, said staff being coupled only to a member that is submerged in the body of water, whereupon said staff is oriented vertically in a quiescent state, said body comprising:
   at least two vertical fins and at least one horizontal fin whose sizes are correlated to wave parameters, said at least two vertical fins and said at least one horizontal fin effecting axial motion and rocking motion to said buoy to transfer wave energy into wake energy to thereby dissipate the wave energy regardless of the direction of wave travel.

2. The buoy of claim 1 wherein one of said wave parameters is wave height.

3. The buoy of claim 2 wherein another one of said wave parameters is wave period.

4. The buoy of claim 3 wherein said buoy dissipates and radiates a portion of the wave in a bi-modal manner.

5. The buoy of claim 4 wherein said buoy operates in axial and angular modes.

6. The buoy of claim 1 wherein one of said at least two vertical fins is an angularly oriented fin.

7. The buoy of claim 1 wherein body comprises a cylinder.

8. The buoy of claim 1 wherein said buoy is constrained by said anchor being coupled to said body by a ball joint or a swivel joint, spring or other flexible joint.

9. The buoy of claim 1 wherein said staff comprises a submerged end that is coupled to said member that is submerged in the body of water.

10. The buoy of claim 9 wherein said member that is submerged in the body of water is an anchor.

11. The buoy of claim 9 additionally comprising a ballast, wherein said ballast is a sting ballast.

12. The buoy of claim 1 wherein said at least two vertical fins or said at least one horizontal fin are tapered to a point.

13. The buoy of claim 1 wherein said at least two vertical fins or said at least one horizontal fin are tapered to a truncated end.

14. The buoy of claim 1 wherein said at least two vertical fins or said at least one horizontal fin are tapered to a rounded end.

15. A method for reducing the amplitude of waves traveling in a body of water, said method comprising:
   positioning a buoy in the body of water to experience waves travelling therethrough, said buoy comprising a body that is freely slidably coupled onto a staff and wherein said body comprises least two vertical fins and at least one horizontal fin whose sizes are correlated to wave parameters;
   coupling said buoy only to a member submerged in the body of water wherein said staff is oriented vertically in a quiescent state; and
   wherein said at least two vertical fins and said at least one horizontal fin effect axial motion and rocking motion to said buoy to transfer wave energy into wake energy to thereby dissipate the wave energy regardless of the direction of wave travel when said buoy is exposed to the waves.

16. The method of claim 15 wherein said step of externally coupling said buoy comprises coupling a submerged end of said staff to the submerged member.

17. The method of claim 16 wherein said submerged member is an anchor in a waterbed.

18. A floating breakwater system for reducing the amplitude of waves traveling in water, said system comprising plural buoys disposed at predetermined spacing from each other, each of said buoys comprising:
   a unitary body that is freely slidably coupled onto a staff and slidable as a unit along said staff, said staff being coupled only to a member that is submerged in the body of water whereupon said staff is oriented vertically in a quiescent state, said unitary body comprising:
   at least two vertical fins and at least one horizontal fin whose sizes are correlated to wave parameters, said at least two vertical fins and said at least one horizontal fin effecting axial motion and rocking motion to said respective buoy to transfer wave energy into wake energy to thereby dissipate the wave energy regardless of the direction of wave travel to said floating breakwater system.

19. The system of claim 18 wherein one of said wave parameters is wave height.

20. The system of claim 19 wherein another one of said wave parameters is wave period.

21. The system of claim 20 wherein said buoy dissipates and radiates a portion of the wave in a bi-modal manner.

22. The system of claim 21 wherein said buoy operates in axial and angular modes.

23. The system of claim 18 wherein one of said at least two vertical fins is an angularly oriented fin.

24. The system of claim 18 wherein body comprises a cylinder or any other geometric body design that provides the same attenuation effects.

25. The system of claim 18 wherein said buoy is constrained by said submerged member being coupled to said body by a ball joint or a swivel joint or spring or any other flexible connection.

26. The system of claim 18 wherein a submerged end of said staff is coupled to said submerged object.

27. The system of claim 26 wherein said said member that is submerged in the body of water is an anchor.

28. The system of claim 26 wherein said unitary body of each buoy additionally comprises a ballast, wherein said ballast is a sting ballast.

29. The system of claim 18 wherein said at least two vertical fins or said at least one horizontal fin are tapered to a point.

30. The system of claim 18 wherein said at least two vertical fins or said at least one horizontal fin are tapered to a truncated end.

31. The system of claim 18 wherein said at least two vertical fins or said at least one horizontal fin are tapered to a rounded end.

32. The system of claim 18 being self-adjusting wherein pendulum motion manifested by said plural buoys exposed to waves is shorter for shallow water comprising shallow waves and is longer for deeper water comprising longer waves.

33. A method of forming a floating breakwater system for reducing the amplitude of waves traveling in a body of water, said method comprising:
   positioning a plurality of buoys at predetermined spacing from each other in water that experiences waves travelling therethrough, each of said buoys comprising a unitary body that is freely slidably coupled onto a staff and slidable as a unit along said staff, and wherein said unitary body comprises at least two vertical fins and at least one horizontal fin whose sizes are correlated to wave parameters;

coupling each of said buoys only to a respective member that is submerged in the body of water wherein said staff of each of said buoys is oriented vertically in a quiescent state; and wherein said at least two vertical fins and said at least one horizontal fin effect axial motion and rocking motion to said buoy to transfer wave energy into wake energy to thereby dissipate the wave energy regardless of the direction of wave travel to said floating breakwater system.

34. The method of claim 33 wherein each of said staffs comprises a submerged end portion and wherein said step of coupling each of said buoys to a respective member submerged in the body of water comprises coupling said respective submerged ends of said staffs to respective ones of the members submerged in the body of water.

35. The method of claim 34 wherein each of the respective members submerged in the body of water is an anchor.

* * * * *